United States Patent [19]
Vross et al.

[11] Patent Number: 5,951,725
[45] Date of Patent: Sep. 14, 1999

[54] SYSTEM FOR REMOVAL OF NOXIOUS FUMES

[75] Inventors: Anthony R. Vross, Canfield; James Simon, Jr., Poland; Tim Tarr, Youngstown; Jeff Sipos, Austintown, all of Ohio

[73] Assignee: National Tool and Equipment, Inc., Boardman, Ohio

[21] Appl. No.: 08/939,360

[22] Filed: Sep. 29, 1997

Related U.S. Application Data

[63] Continuation-in-part of application No. 08/639,024, Jun. 7, 1996, Pat. No. 5,873,919, which is a continuation-in-part of application No. 08/478,785, Jun. 7, 1995, Pat. No. 5,591,244.

[51] Int. Cl.$^6$ ..................................................... B01D 50/00
[52] U.S. Cl. ........................... 55/356; 55/357; 55/385.1; 55/385.4; 126/343.5 A; 222/146.5; 222/152; 239/130; 454/65
[58] Field of Search ............................... 55/356, 357, 358, 55/385.1, 385.4, 385.7; 126/343.5 A; 222/146.5, 152, 626; 239/130; 454/63, 65; 401/1, 2, 48

[56] References Cited

U.S. PATENT DOCUMENTS

| | | |
|---|---|---|
| 935,681 | 10/1909 | Obermann . |
| 1,694,806 | 12/1928 | Yale . |
| 2,839,332 | 6/1958 | Sackett . |
| 2,874,733 | 2/1959 | Sesler et al. ............................... 454/63 |
| 2,893,642 | 7/1959 | Callery ............................. 126/343.5 A |
| 2,969,894 | 1/1961 | Reustle . |
| 2,970,351 | 2/1961 | Rice . |
| 3,106,344 | 10/1963 | Baird, Jr. et al. . |
| 3,359,970 | 12/1967 | Pedersen et al. . |
| 3,581,782 | 6/1971 | Onufer . |
| 3,675,400 | 7/1972 | Kubsch . |
| 3,718,131 | 2/1973 | Busse et al. ..................... 126/343.5 A |
| 3,807,634 | 4/1974 | Vogt . |
| 3,844,901 | 10/1974 | Roe et al. . |
| 3,946,722 | 3/1976 | Banahan . |
| 3,955,236 | 5/1976 | Mekelburg . |
| 3,973,887 | 8/1976 | Breckenfelder . |

(List continued on next page.)

FOREIGN PATENT DOCUMENTS

| | | |
|---|---|---|
| 629422 | 4/1936 | Germany . |
| 37 34 271 | 4/1989 | Germany . |
| 494829 | 6/1954 | Italy . |
| 52-28775 | 3/1977 | Japan ....................................... 454/63 |
| 22434 | of 1906 | United Kingdom . |
| WO 90/11845 | 10/1990 | WIPO ................................... 454/65 |

OTHER PUBLICATIONS

FRS–6000™ Fume Recovery System Evaluation, Air Sampling Survey Results, Simon Roofing, Sep. 1, 1995.

*Primary Examiner*—C. Scott Bushey
*Attorney, Agent, or Firm*—Fay, Sharpe, Beall, Fagan, Minnich & McKee, LLP

[57] ABSTRACT

A system which reduces the transmission of noxious fumes into the surrounding air during the application of a heated liquid roofing product on a roof. A mobile tanker or kettle contains a supply of the heated liquid. The air space within the tanker or vessel above the liquid product communicates with a mobile filtration unit by a first duct. A rooftop carrier for the liquid product has a fume collection hood which communicates with the filtration unit by a second duct. A blower in the filtration unit creates negative pressure which draws the noxious fumes from the tanker or vessel and carrier through the ducts and into and through the filtration unit. The filtration unit has a series of airtight chambers mounted on a mobile truck bed, each containing a different type of filtering medium to remove various components of the noxious fumes as the fumes move through the filtration unit. Also provided is a compact, mobile system including an easily manipulable wand applicator for applying roofing products to remote locations on a rooftop. The wand is equipped with a fume hood and vacuum conduit for controlling the emissions from the roofing product at the point of application.

16 Claims, 14 Drawing Sheets

U.S. PATENT DOCUMENTS

| | | |
|---|---|---|
| 4,028,527 | 6/1977 | Thagard, Jr. . |
| 4,033,328 | 7/1977 | Lohman et al. ................. 126/343.5 A |
| 4,087,333 | 5/1978 | Naevestad . |
| 4,095,625 | 6/1978 | Marpe ..................................... 55/385.1 |
| 4,344,571 | 8/1982 | Kündig . |
| 4,450,900 | 5/1984 | Nathan . |
| 4,512,245 | 4/1985 | Goldman . |
| 4,563,943 | 1/1986 | Bertelsen . |
| 4,620,645 | 11/1986 | Hale ....................................... 222/152 |
| 4,770,088 | 9/1988 | Kistner . |
| 4,804,392 | 2/1989 | Spengler . |
| 4,865,628 | 9/1989 | Iwanczyk . |
| 4,932,354 | 6/1990 | Kistner . |
| 5,004,483 | 4/1991 | Eller et al. . |
| 5,036,754 | 8/1991 | Simms et al. . |
| 5,064,451 | 11/1991 | Phillips . |
| 5,069,691 | 12/1991 | Travis et al. . |
| 5,073,259 | 12/1991 | Solimar . |
| 5,093,896 | 3/1992 | Moore et al. . |
| 5,160,515 | 11/1992 | Nelson et al. . |
| 5,191,909 | 3/1993 | Nadeau et al. . |
| 5,239,615 | 8/1993 | Moore et al. . |
| 5,281,246 | 1/1994 | Ray et al. . |
| 5,297,893 | 3/1994 | Corcoran et al. ......................... 55/320 |
| 5,358,347 | 10/1994 | Morris ...................................... 401/48 |
| 5,366,308 | 11/1994 | Crispino . |
| 5,443,325 | 8/1995 | Simonelli et al. . |
| 5,470,176 | 11/1995 | Corcoran et al. . |
| 5,520,335 | 5/1996 | Claussen et al. . |
| 5,591,244 | 1/1997 | Vross et al. ............................... 454/65 |
| 5,622,023 | 4/1997 | Crispino . |
| 5,762,664 | 6/1998 | Vross et al. ...................... 126/343.5 A |
| 5,873,919 | 2/1999 | Vross et al. ............................... 55/356 |

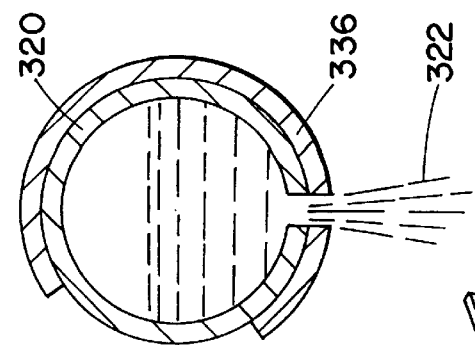
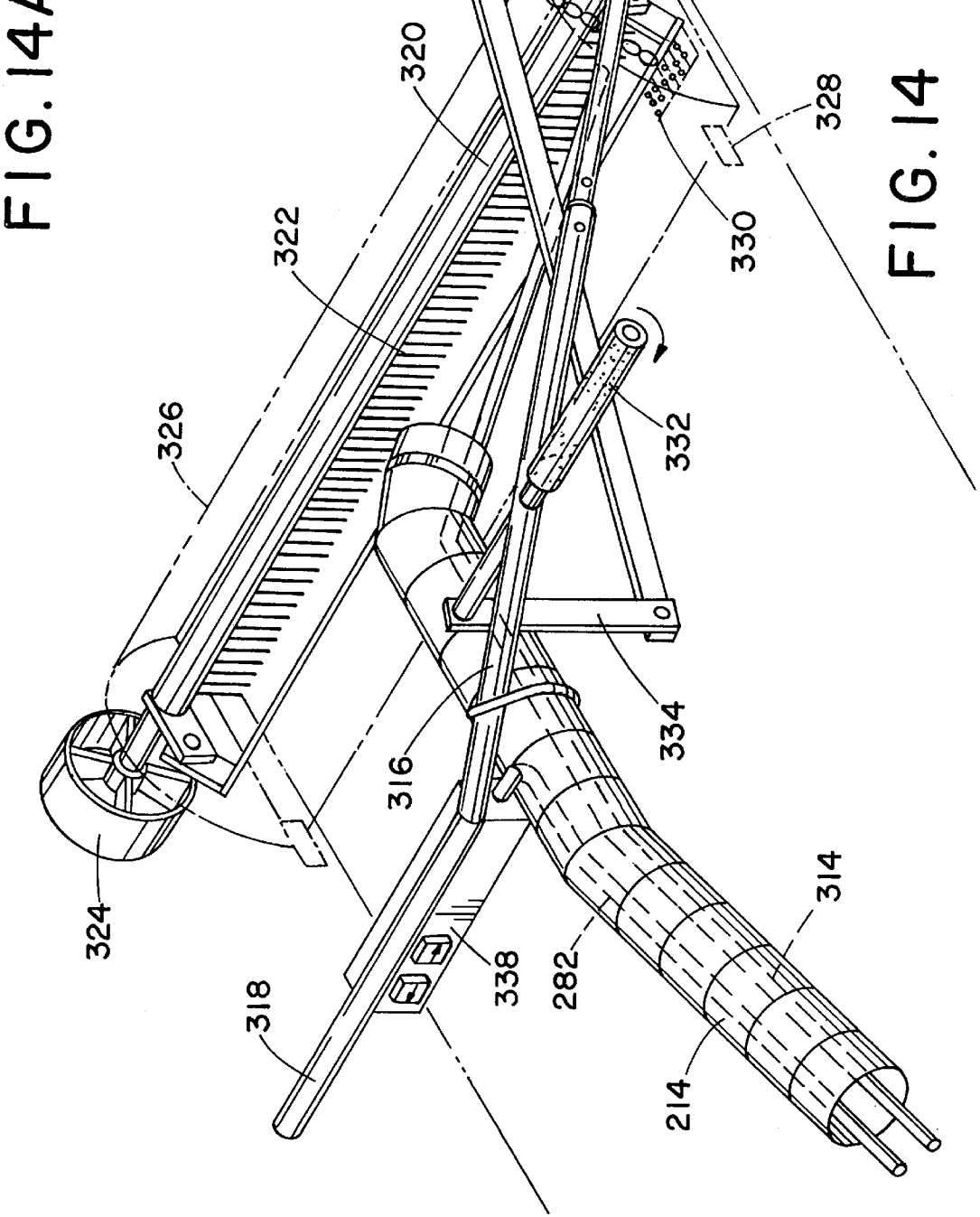

SYSTEM FOR REMOVAL OF NOXIOUS FUMES

CROSS REFERENCE TO RELATED APPLICATION

This application is a continuation-in-part of co-pending application Ser. No. 08/639,024 filed Jun. 7, 1996, now U.S. Pat. No. 5,873,919, which is a continuation-in-part of co-pending application Ser. No. 08/478,785, filed Jun. 7, 1995, now U.S. Pat. No. 5,591,244.

BACKGROUND OF THE INVENTION

1. Technical Field

The invention relates to a system for removing noxious fumes during the application of a heated roofing product on a roof. More particularly, the invention relates to a mobile unit in which the noxious fumes are removed from the liquid roofing supply tanker or kettle, and from a rooftop carrier for the liquid roofing product, preventing the escape of the noxious fumes produced by the heated roofing product into the surrounding atmosphere. Even more particularly, the invention relates to such a mobile unit having a filtration unit which collects the noxious fumes and removes the majority of the contaminants contained therein prior to discharging the cleaned fumes into the surrounding atmosphere. Furthermore, the invention relates to a mobile unit having an incineration unit which incinerates and then removes a portion of the contaminants by cooling of the contaminants before passing them through the filtration unit.

The invention also relates to a mobile system for controlling emissions from roofing products, which system incorporates a highly maneuverable applicator equipped with a device for gathering emissions at the point of application of the roofing products. Furthermore, the invention relates to a roofing product application system which integrates a device for storing, maintaining the temperature of and applying roofing products with a device for collecting and filtering roofing product emissions.

2. Background Information

A fume problem exists for roofing companies and their customers during the application of hot roofing materials to a roof for waterproofing the roof. Fumes from roofing tar, asphalt or other bituminous products can contaminate food or beverages, and are potentially hazardous to people inhaling the fumes. The fumes escape at a job site into the surrounding atmosphere from several areas, such as the tanker truck or kettle which holds the heated material to be applied to the roof, and/or the rooftop carrier which holds small amounts of the roofing material on the roof for application of the material by the roofers onto the roof. This problem has been recognized in the industry, and others have attempted to solve the same. For example, U.S. Pat. No. 4,770,088 shows a movable enclosure which moves along the roof and encloses the roofing material application nozzle within the confines of the enclosure to retard the escape of harmful materials and/or noxious fumes into the surrounding atmosphere.

Various other types of filtration units have been used for removing noxious fumes from various types of situations unrelated to the roofing industry, such as shown in U.S. Pat. Nos. 4,450,900, 4,512,245, 4,563,943, 4,804,392, 5,004,483, 5,036,754, 5,069,691, 5,191,909 and 5,281,246. These prior art fume removal devices and systems, many of which contain filters for purifying the collected fumes, are not applicable to the roofing industry since it is necessary that the fume removal system and filtration unit be mobile, enabling the roofer to transport the system rapidly and inexpensively to various job sites in order to be used during the application of the roofing material to the roof.

Furthermore, none of the known prior art filtration systems incorporate an incineration stage, preferably using an open burner flame to convert oils contained within the fumes into dry particulates which then can be readily removed by conventional filter stages.

Furthermore, none of these prior art filtration units incorporate a cooling chamber for cooling heated fumes prior to passing the fumes through the filtration unit to assist and facilitate the removal of noxious materials therefrom.

Still further, known application systems are limited in their portability or maneuverability and fail to provide a high degree of maneuverability for a single operator while providing a high degree of safety and protection.

Thus, the need exists for a system for the removal of noxious fumes during the application of heated roofing material to a roof in which the system is mobile, yet effective for removing the majority of the noxious fumes at a minimum of cost.

It is also desirable to provide a system for the application of roofing products which offers more efficient, safer and easier operation than prior art devices.

SUMMARY OF THE INVENTION

Objectives of the invention include providing a system for the removal of noxious fumes when applying a heated roofing material to a roof wherein the system is mobile and compact, enabling it to be moved between various job sites and positioned in close proximity to a building, often in confined spaces.

A further objective of the invention is to provide such a system which materially reduces the discharge of noxious fumes into the surrounding atmosphere from both the rooftop carrier, which carries a small quantity of the heated material for application to the roof, and from the mobile tanker or kettle, which is usually situated adjacent the building and pumps the heated material to the rooftop carrier located on the roof above.

Another objective of the invention is to provide such a system which includes a mobile filtration unit having a series of filters, each of which removes a particular component from the noxious fumes as the fumes are drawn from the rooftop carrier and tanker or kettle, and through the mobile filtration unit before the fumes are discharged into the surrounding atmosphere.

Still another objective of the invention is to provide such a system in which the filtration unit consists of a series of filters, wherein the various filtering media can be changed to more efficiently remove the various components contained within the noxious fumes of a particular roofing material being utilized on a particular job.

Another objective of the invention is to provide such a system in which the filtration unit can be powered either electrically if a source of electricity is available, or by a fuel-driven engine, such as liquid propane which is usually available on a roofing job site for heating of the roofing material.

A still further objective of the invention is to provide such a system which is relatively compact and mobile, and is easily transported to a job site and set up for operation with a minimum amount of workers and time.

A further objective of the invention is to provide such a system which incorporates a burner or incineration unit upstream from the filtration unit which exposes the incoming fumes to an open flame which incinerates the heavy oils and vapors contained in the fumes and converts them into dry particulates, water vapor and various gases, which are more easily removed by the filtration unit located downstream therefrom.

Another objective of the invention is to provide such a system in which a cooling chamber or air plenum is located adjacent to and upstream from the filtration unit to cool the heated fumes prior to their passing into the filtration unit to further assist in removing various particles and vapors therefrom.

Yet another objective of the invention is to provide a system for applying roofing products, which system permits an operator to easily apply roofing products and which allows the collection and evacuation of roofing product emissions at the point of application.

These objectives and advantages of the system of the present invention for the removal of noxious fumes during the application of a liquid roofing product to a roof include a mobile vessel adapted to contain a supply of a liquid roofing product; a mobile filtration unit having an inlet and an outlet; first duct means extending between the vessel and the filtration unit for drawing fumes accumulating above the roofing product within the vessel into the filtration unit; a mobile carrier adapted to hold a quantity of the roofing product on a roof of a building adjacent the vessel and filtration unit; second duct means extending between the carrier and the filtration unit for drawing fumes from the carrier into the filtration unit; and blower means for moving the fumes from the carrier and vessel duct means through the filtration unit to condition the fumes before discharging them into the surrounding atmosphere.

These objectives and advantages are further obtained by the system of the present invention for reducing the transmission of noxious fumes emanating from a material into the surrounding atmosphere, wherein said system includes a vessel adapted to contain a supply of the material; a filtration unit having an inlet and an outlet; duct means for transferring fumes emanating from the material within the vessel into the filtration unit; means for moving the fumes from the vessel and through the filtration unit to condition the fumes before discharging the fumes into the atmosphere; and burner means located between the inlet of the filtration unit and the vessel for heating the fumes to reduce certain portions of the fumes into dry particulates for subsequent removal by the filtration unit.

These objectives and advantages are still further obtained by the system of the present invention for reducing the transmission of noxious fumes emanating from a heated material into the surrounding atmosphere, wherein said system includes a vessel adapted to contain a supply of the material; a filtration unit having an inlet and an outlet; duct means for transferring heated fumes emanating from the material within the vessel into the filtration unit; means for moving the heated fumes from the vessel and through the filtration unit to condition the fumes before discharging the fumes into the atmosphere; and cooling means located between the inlet of the filtration unit and the vessel for cooling the heated fumes to facilitate the removal of certain portions of the fumes by the filtration unit.

These objectives and advantages are still further obtained by the system of the present invention which includes a mobile, compact application system including a fume recovery system integrated with a bituminous reservoir and applicator, the applicator including a device for collecting, evacuating and thereby controlling emissions from the bituminous roofing products at the point of application.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 14 is an isometric of an applicator wand according to a preferred embodiment of the present invention.

Similar numerals refer to similar parts throughout the drawings.

DESCRIPTION OF THE PREFERRED EMBODIMENT

Figure 1:
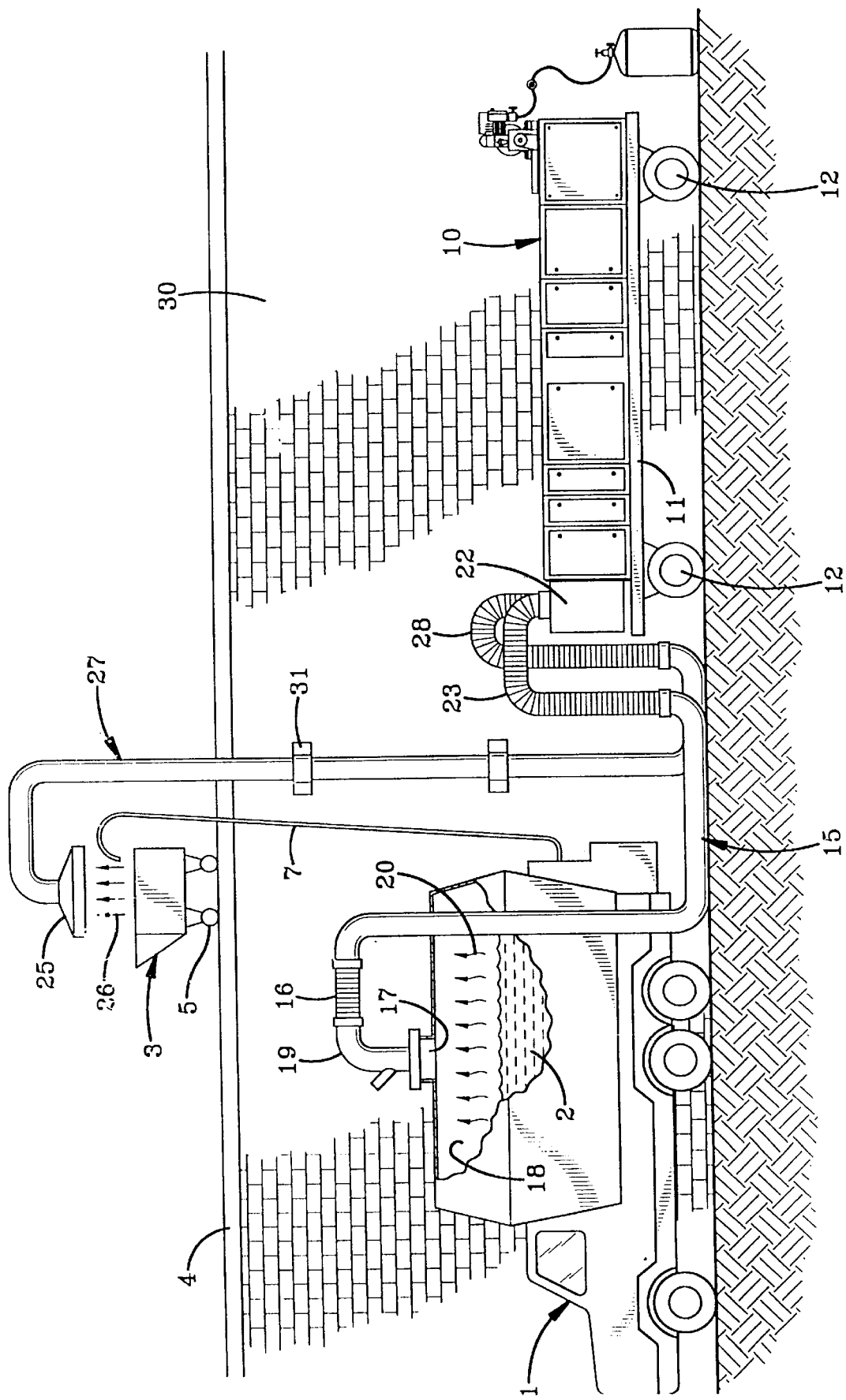
FIG. 1 is a diagrammatic elevational view showing the system of the present invention consisting of a mobile tanker, a filtration unit and a rooftop carrier at a job site.

The system of the present invention for the removal of noxious fumes during the application of a heated roofing material to a roof is shown diagrammatically in FIG. 1. The system includes a usual mobile kettle or roofing tanker, indicated generally at 1, which contains a supply of heated liquid roofing material 2, such as tar or various types of heated bituminous material, which materials are standard and used throughout the roofing industry. A self-contained mobile roofing tanker 1 is shown in the drawings and described below for transporting the material to a job site. However, a usual heated kettle of the type mounted on a trailer and pulled by a separate vehicle can also be used without affecting the concept of the invention. These units are referred to as a mobile vessel.

The improved system further includes a usual rooftop carrier 3 which is movable across a roof 4 on a plurality of wheels 5 for containing a small amount of roofing product 2 in a heated state for application on the roof by the workers as carrier 3 is moved therealong, usually by manually pushing the carrier across the roof. The liquid roofing material will usually be pumped from the mobile vessel into rooftop carrier 3 through a material supply line 7 which extends between the vessel and rooftop carrier.

In accordance with one of the features of the invention, a mobile filtration unit, indicated generally at 10, is in close association with tanker 1 and rooftop carrier 3. Filtration unit 10 includes a flatbed trailer 11 movable by a plurality of pneumatic tire/wheel assemblies 12, enabling it to be easily transported to most job sites. The details of mobile unit 1 are shown particularly in FIG. 2 and are discussed further below.

A conduit, indicated generally at 15, which may include a flexible joint 16, extends into a top opening 17 of tanker 1 to provide communication with air space 18 formed within tanker 1 above liquid roofing material 2. Conduit 15 may include an elbow 19 which extends through opening 17 and is sealed by a substantially fluid-tight seal to prevent the escape of the noxious fumes, indicated at 20, into the surrounding atmosphere. Conduit 15 is connected at the opposite ends to the inlet of a plenum 22 of filtration unit 10, preferably by a flexible section of conduit 23.

In further accordance with the invention, a collection hood 25 will be mounted closely adjacent the open top of rooftop carrier 3 for drawing noxious fumes 26 into the hood and then into a second conduit 27. The collected fumes will be transported into plenum 22 through a flexible elbow 28 or other usual conduit-type of connection. Conduit 27 may be temporarily secured to building 30 by brackets 31, if necessary, depending upon the height of the building and location of filtration unit 10 with respect thereto.

Figure 2:
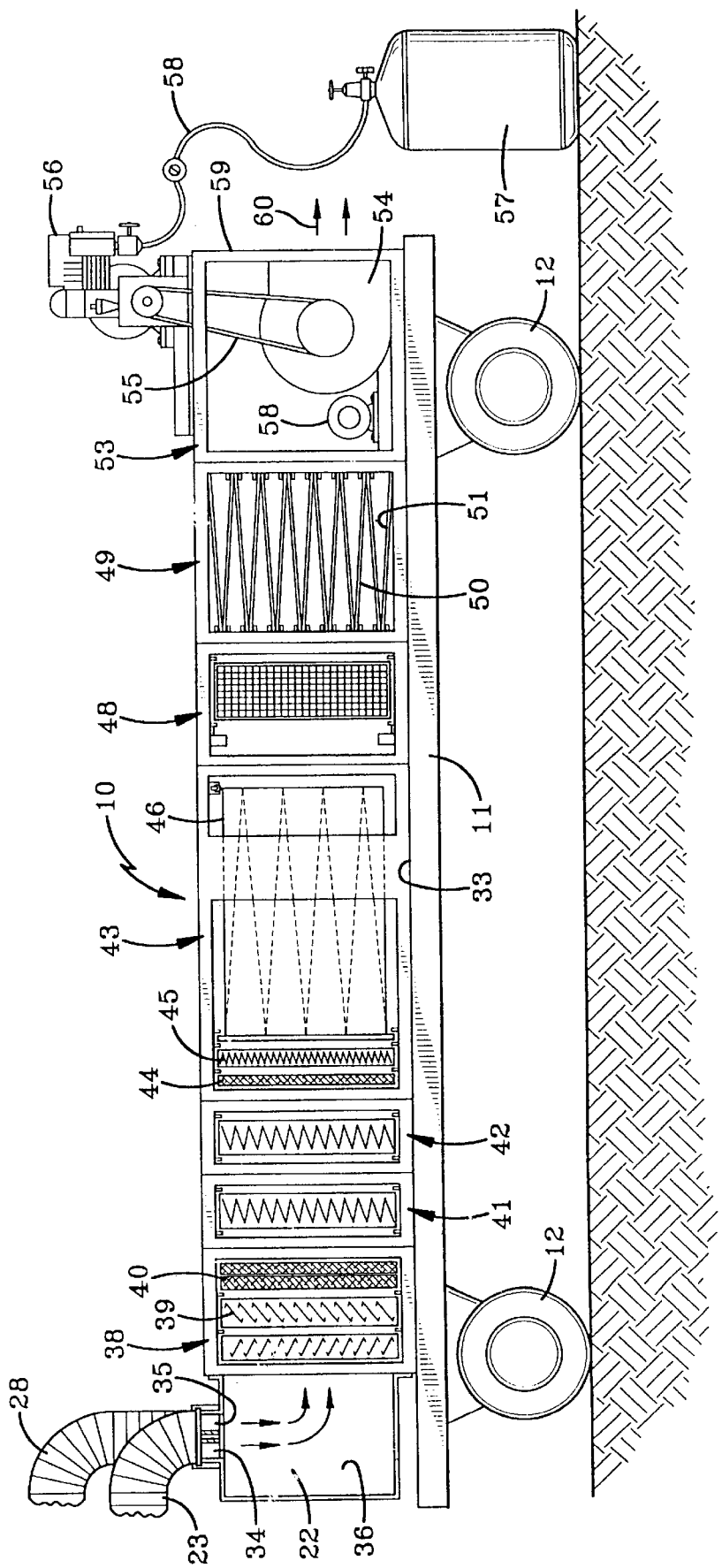
FIG. 2 is an enlarged view of the mobile filtration unit of the system shown in FIG. 1, with the side of the filtration unit being removed to show the various filtering media contained therein.

Referring to FIG. 2, filtration unit 10 includes a number of individual filtration compartments connected in and end-to-end relationship and mounted on and extending along the flat top surface 33 of trailer 11. Each of the filtering compartments or chambers is comprised of a heavy gauge sheet metal frame to form the chamber, which frames are bolted together in the end-to-end relationship. Numerous types of specific-purpose permanent and disposable filters are sequentially installed throughout filtration unit 10. Although the unit is essentially self contained, routine maintenance in the form of cleaning and filter replacement is carried out for efficient operation.

Plenum 22 includes a pair of openings 34 and 35 which communicate with the outlets of conduits 15 and 27, whereby fumes 20 and 26 flow into the hollow interior 36 of plenum 22. A first filtration cabinet 38 is mounted adjacent plenum 22 and is referred to an impinger module. Its main purpose is the removal of major amounts of airborne oil, grease, and solvent residues. This impinger module will contain a series of impingers 39 formed of sheet metal, and an aluminum mesh filter 40. The next two filtration chambers, indicated at 41 and 42, referred to as multi-vee cabinets, are used as pre-filters for larger particulates in dry or slightly wet vapors of gas or dust. These filters usually contain a disposable treated paper filter medium.

The next filtering chamber, indicated at 43, is intended for the filtering of oil mist and smoke fumes. Filter module 43 includes an initial aluminum mesh filter 44 at the inlet end thereof, a treated paper filter 45, and vee bags 46, which collect any particles passing through the other filters. The next filtering cabinet is referred to a HEPA cabinet 48, and functions as a secondary fine filter for smoke films and soot. It will contain a fine particulate air filtering material, which in the preferred embodiment is rated 99.97% efficient at 0.3 microns. The final filtering cabinet or module, indicated at 49, is a carbon filter. It contains a plurality of removable trays 50 containing granular activated carbon 51. This activated carbon will remove odors, gases and vapors remaining in the fumes after the fumes leave HEPA chamber 48.

The final chamber or compartment, indicated at 53, is the blower module. It contains a blower housing 54 containing a usual internal blower (not shown), which is connected by a drive belt 55 to an internal combustion engine 56. Engine 56 may be gasoline driven, or in the preferred embodiment, is connected to a tank of liquid propane 57 by a regulated fluid supply line 58. Alternatively, if a supply of electricity is readily available, a usual electric drive motor 58, which is also mounted within blower module 53, may be connected by a drive belt to blower housing 54 for rotating the internal blower. The blower draws air from plenum 22 through the various filtering modules and through an outlet opening 59 and into the surrounding atmosphere. The vapors being discharged, as shown by arrows 60, are relatively free of most harmful particulates, odors and other noxious contaminants. The blower will create a negative pressure within filtration unit 10, as well as within top air space 18 of tanker 1, and within hood 25 adjacent rooftop carrier 3, in order to draw the noxious fumes through conduits 15 and 27 and into plenum 22 of filtration unit 10 for filtration before being discharged to the atmosphere through outlet opening 59.

A typical site setup, shown particularly in FIG. 1, will position the filtration unit 10 on level solid ground near tanker 1 adjacent the side of the building, wherein the application of a heated roofing material is desired. The various lengths of flexible conduits forming conduits 15 and 27 will be connected between the inlets of plenum 22 and tanker 1 and rooftop carrier 3. The particular configuration and makeup of the individual conduits can vary depending upon the particular job site and the length of conduit needed to extend between filtration unit 10, tanker 1 and rooftop carrier 3. Hood 25 preferably is positioned approximately two feet above the opening of the rooftop carrier, whereas the cover on tanker 1 preferably forms an airtight closure with the conduit. Each of the filtration modules preferably has an access door (not shown) which is closed and latched in a generally airtight condition upon startup, after the various filtering media contained therein are checked and are in a clean state from a previous roofing job site.

The particular filtering arrangement of filtration unit 10 described above has been found to provide the most desired sequence of filters, with the individual filters thereof being of the particular type described above. These filtration modules preferably are of the type manufactured and sold by Aercology, Inc. of Old Saybrook, Conn., which are identified under its trademark "Modular Media Filters". The size of the various modules and particular filtering media contained therein will depend upon the particular tanker size, blower motor, and job applications with which the mobile system will be utilized.

Figure 3:
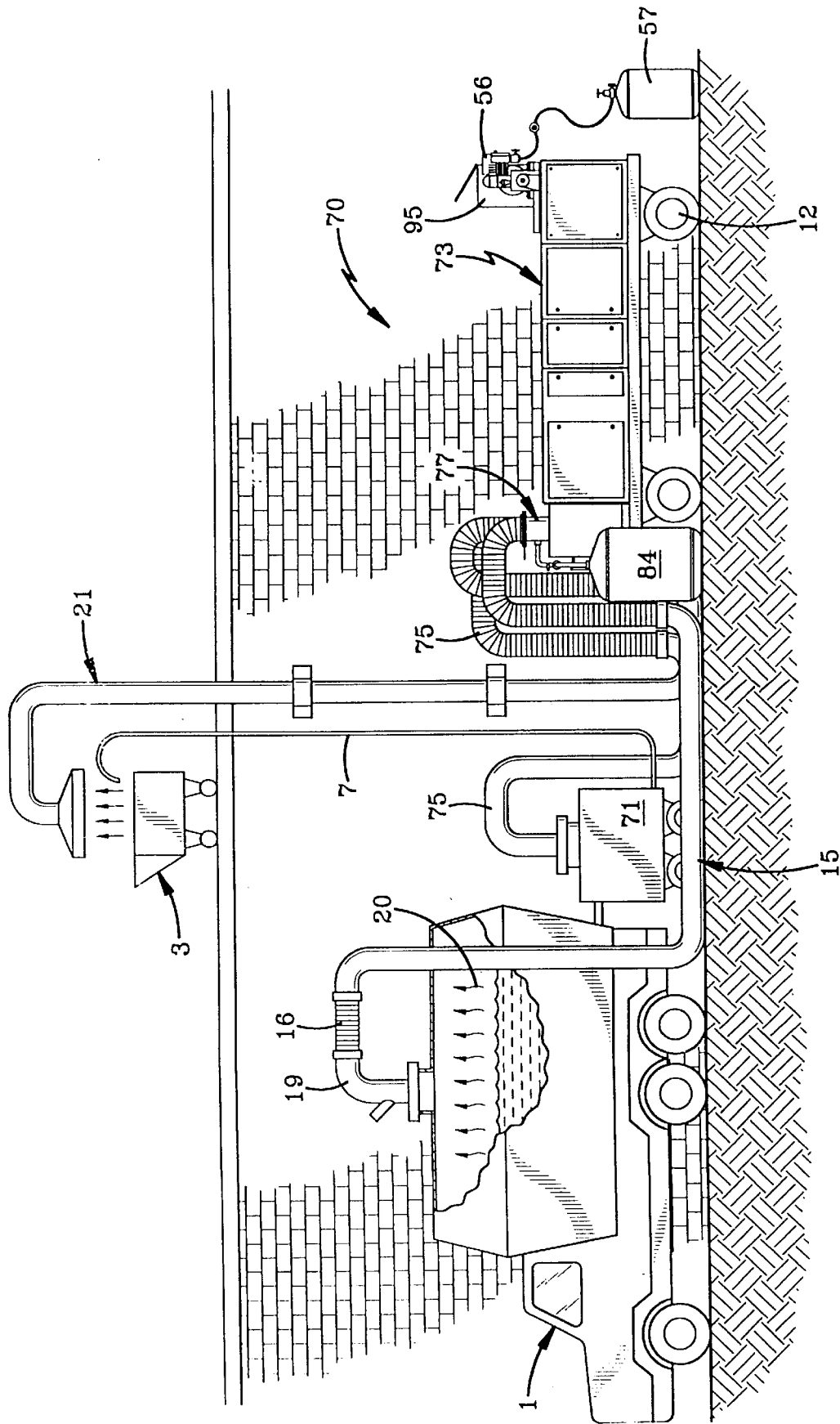
FIG. 3 is a diagrammatic elevational view similar to FIG. 1 showing a modified system of the present invention including a mobile tanker, a filtration unit, a heating kettle, and a rooftop carrier at a job site.
Figure 4:
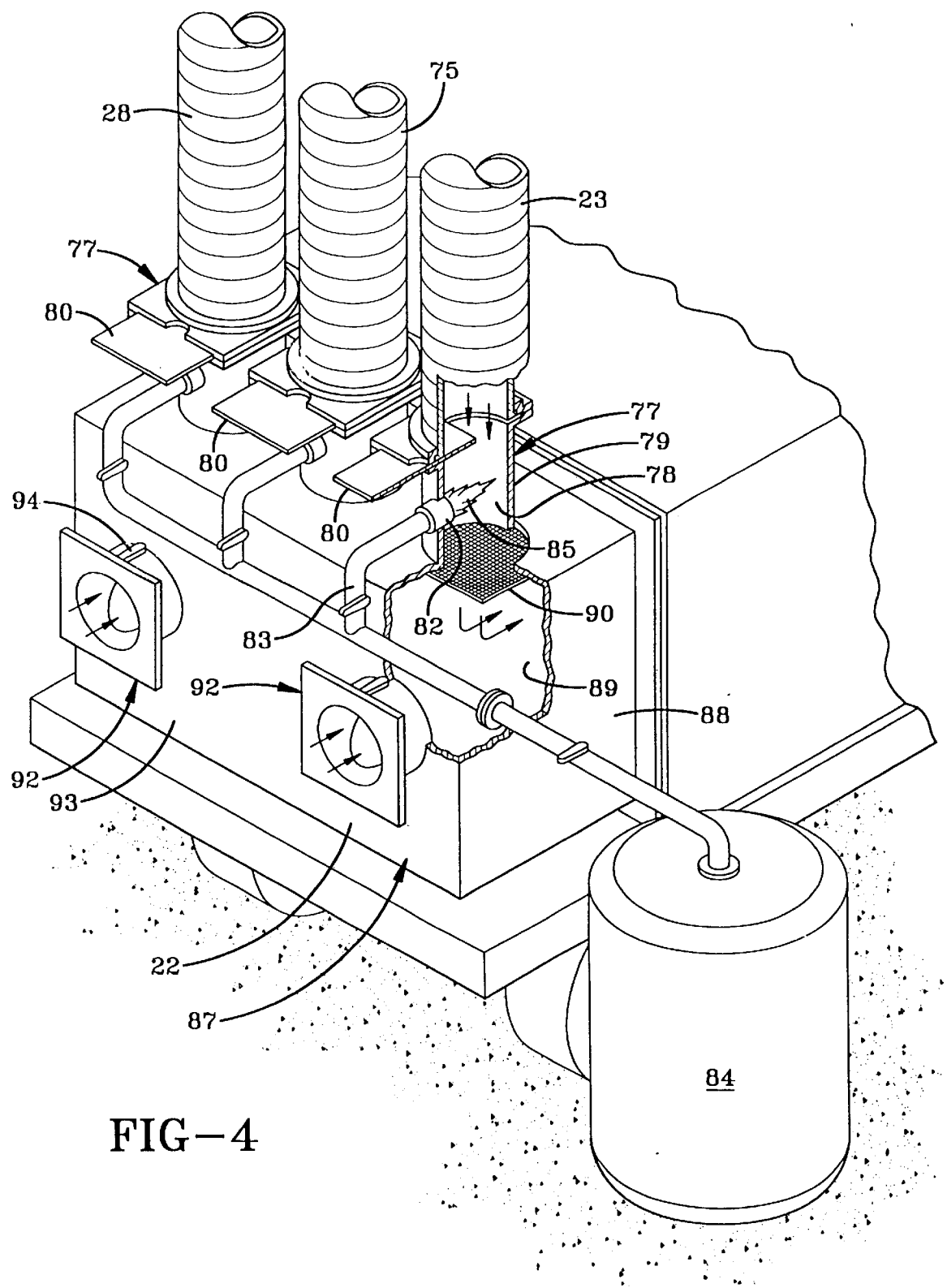
FIG.4 is an enlarged fragmentary view with portions broken away and in section showing a burner unit and a cooling unit mounted at the inlet of the mobile filtration unit.

A second embodiment of the improved filtration system is indicated generally at 70 and is shown in FIG. 3. Embodiment 70 is similar in many respects to the system described above and shown in FIGS. 1 and 2. One of the differences is the use of a third mobile vessel or heating kettle 71 which can either receive heated material from tanker 1 for subsequent transfer to rooftop carrier 3 through supply line 7, or could receive cold solidified blocks of bituminous material therein for subsequent heating and liquification before supplying the hot bituminous liquid to rooftop carrier 3. System 70 includes a modified filtration unit 73, shown in further detail in FIGS. 4 and 5. Filtration unit 73 includes a third flexible conduit or duct 75 which extends between kettle 71 and filtration unit 73 for transferring heated fumes accumulating in the kettle toward filtration unit 73.

In accordance with one of the features of embodiment 70, a burner unit, indicated generally at 77, is located between each incoming fume duct and the filtration unit. Each burner unit 77 (FIG. 4) is preferably similar to each other and includes a burner chamber 78 formed within a cylindrical housing 79. A slide gate valve 80 preferably is incorporated into housing or casing 79 for regulating the amount of incoming fumes entering into the burner chamber.

Each burner unit 77 further includes a burner 82 which is connected by a fuel pipe 83 to a source of fuel 84, such as LP gas. Burner 82 and the fuel source 84 produce an open flame 85 within burner chamber 78 for incinerating certain of the oils and gases contained within the incoming fumes, reducing the same to particulate material for subsequent removal by the filtration unit.

In accordance with another feature of the invention, a cooling unit, indicated generally at 87, is located downstream of the burner units at the inlet of the filtration unit. Cooling unit 87 is formed by a rectangular-shaped generally airtight housing 88, which has a hollow interior 89, which forms plenum 22 for receiving the superheated incoming fumes from burner chambers 78. A heat resistant screen 90 forms a heat barrier between each of the burner chambers 78 and the hollow interior 89 of cooling plenum 22.

In further accordance with the invention, a plurality of ambient air inlet units 92 are mounted on the front wall 93 of housing 88. Each air inlet includes an adjustable valve or damper 94 for regulating the amount of outside ambient air which enters plenum 22.

Thus, the incoming heated fumes from the material, such as a hot bituminous product, is exposed to open flames 85 which incinerates certain portions of the incoming fumes, changing the same into particulate material which is better able to be removed by the filtration unit or which is deposited in and subsequently removed from the bottom of housing 88. The super-heated fumes then enter plenum 22 where it expands and is cooled, preferably by mixing it with the cooler outside ambient air which enters the plenum through air inlet units 92. For example, the heated fumes which accumulate within the upper portion of tanker 1 may be 250 F., with the fumes in ground kettle 71 being approximately 350 F. and the fumes from the rooftop carrier 3 being about 250 F. These heated fumes are then heated even further when exposed to open flames 85. It has been discovered that the cooling of the fumes to a significantly lower temperature, for example, 110 F. or less, increases considerably the efficiency of the filtration unit.

Figure 5:
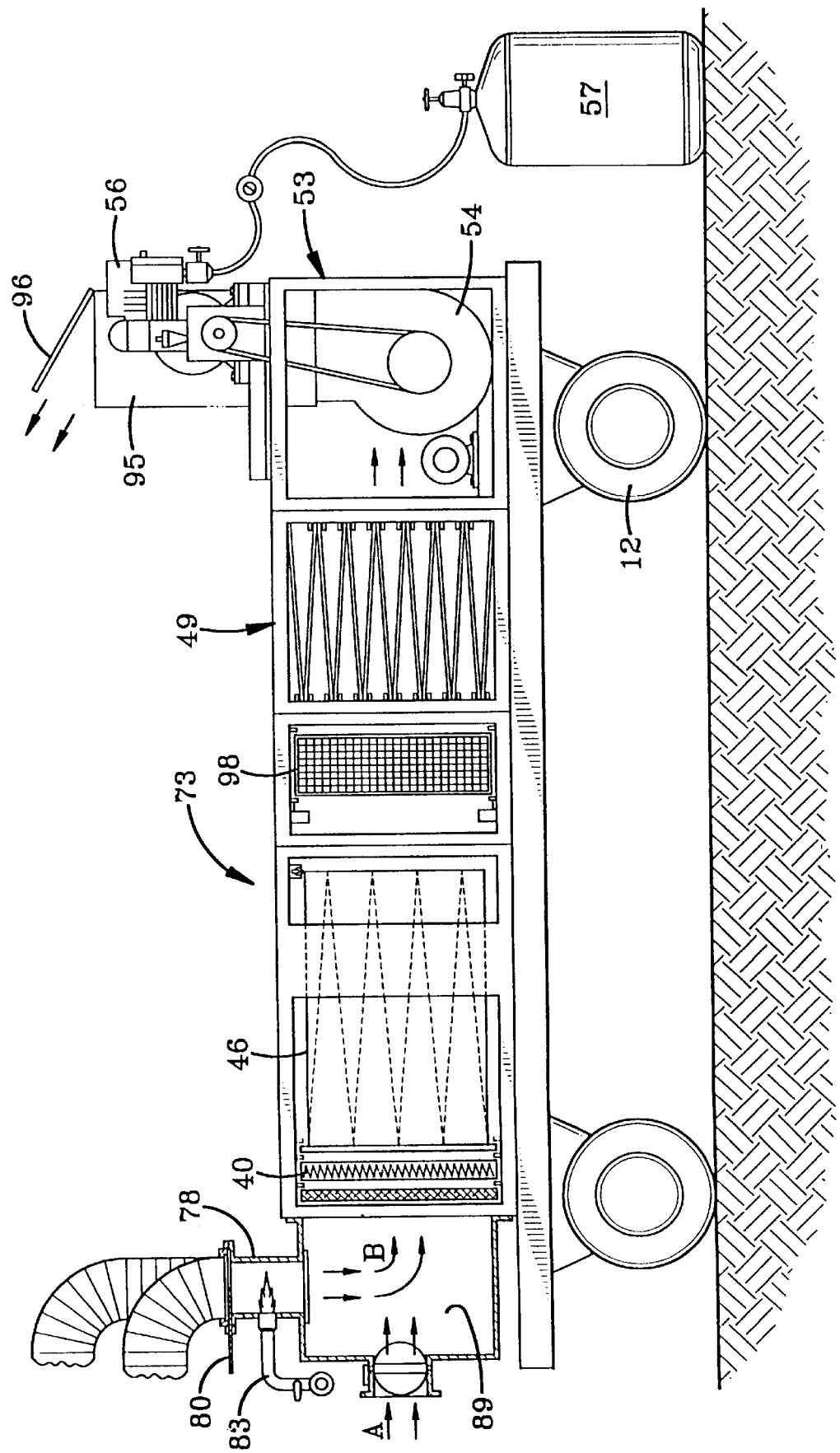
FIG. 5 is an enlarged view of the modified mobile filtration unit of the system shown in FIG. 3, with portions in section, and with the side of the filtration unit being removed to show the various filtering media contained therein.

FIG. 5 shows in further detail modified filtration unit 73 which, due to the incineration of certain of the contaminants within the incoming stream of heated fumes, enables a less expensive, more compact filtering unit to be utilized than that shown in FIGS. 1 and 2. Filtration unit 73 includes an initial aluminum mesh filter 40, and adjacent vee-bags 46 for collecting much of the particulate materials. The fumes then pass through HEPA cabinet 48 for further filtering the fine particulate materials from the stream, prior to the stream passing through filtered carbon filter 49. The filtered fumes then enter into blower module 53 containing a blower which discharges the treated fumes through an exhaust stack 95 which may have a hinged lid 96 mounted thereon. Thus, the exhausted treated fumes are substantially free of harmful contaminants. Engine 56, which powers the blower, is connected to a fuel supply 57, as discussed previously. The blower forms a negative pressure within the filtration unit for drawing the ambient cooling air, indicated by arrow A (FIG. 5), into cooling 20 plenum 22, as well as drawing the heated fumes, indicated by arrow B, through the various ducts into and through burner chambers 78, where the heated fumes are cooled before being drawn through the filtration unit and being discharged through the blower and out of exhaust stack 95 and into the surrounding atmosphere.

By controlling burner unit slide gate valves 80 and ambient air intake dampers 94, the most efficient cooling of the fumes and subsequent filtration thereof can be achieved to provide a highly efficient filtration system for trapping and removing the harmful particles, gases, vapors, etc. from the fumes before they are discharged into the surrounding atmosphere.

Figure 6:
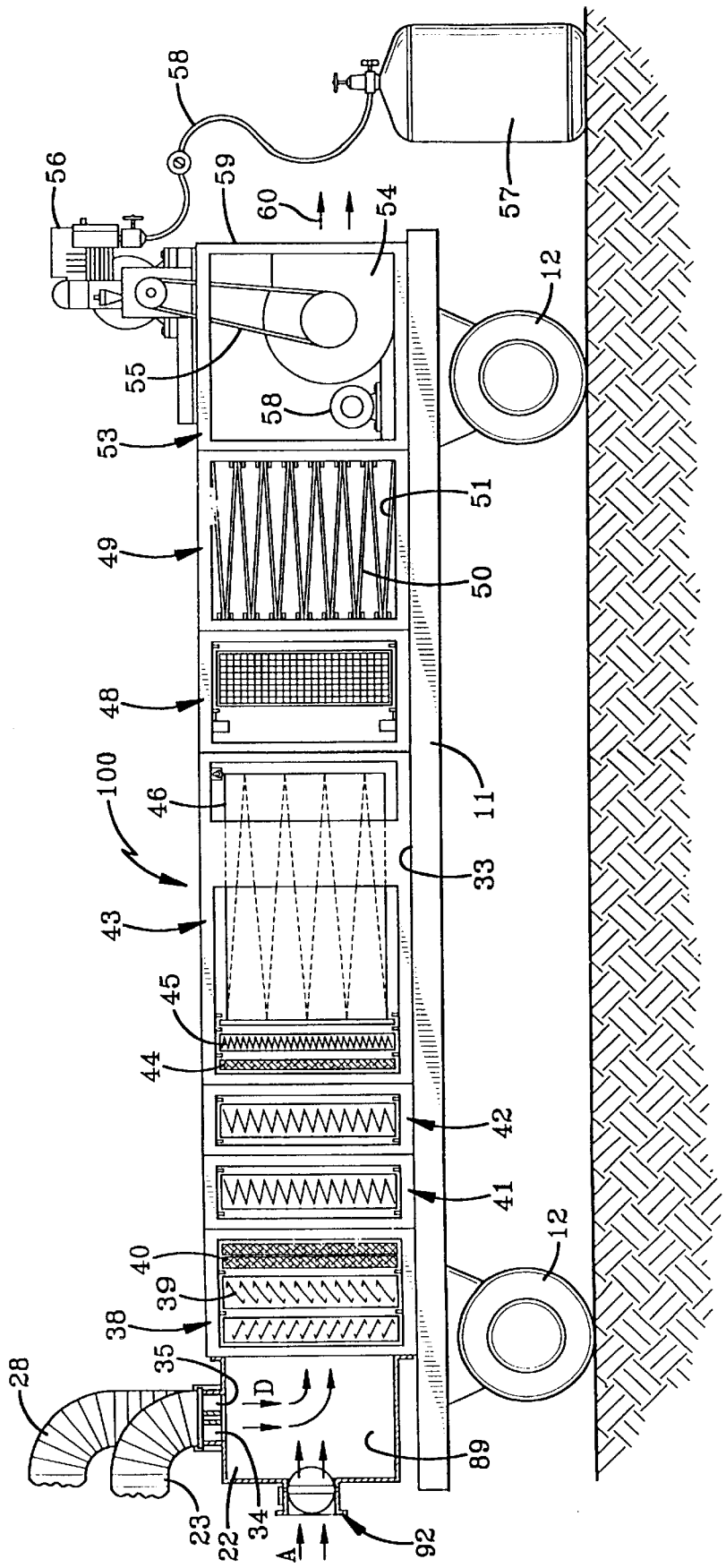
FIG. 6 is a diagrammatic elevational view with portions broken away and in section showing a further modified filtration unit.

A third embodiment of the improved filtration system is indicated generally at 100 and is shown in FIG.6. Filtration unit 100 is similar to filtration unit 10, shown in FIG. 2, with the main difference being the addition of a plurality of cooling air intake units 92 in combination with cooling plenum 22. In the embodiment of FIG. 6, the heated incoming fumes, indicated by arrow D, are not passed through a burner unit prior to being discharged into plenum 22 where they are cooled by the incoming ambient air before being drawn through the filtration unit by the negative pressure created by the blower unit. The cool air is then mixed with the heated fumes to facilitate condensation of the slower moving heated gases or fumes in the plenum to assist in cooling the fumes, as well as solidifying certain of the components therein into particulate materials which can then be more easily removed by the various filters within the filtration unit.

Another aspect of the present invention, as illustrated in FIGS. 7–14 provides a compact mobile, self contained application system which may be deployed onto a rooftop and easily moved thereon to areas of the roof that are remote from the bulk supply of roofing product. This embodiment also provides great ease of use by an operator owing to the ambulatory nature of an applicator wand and includes provision for emission control at the point of application of the roofing product as will be described below.

Figure 7:
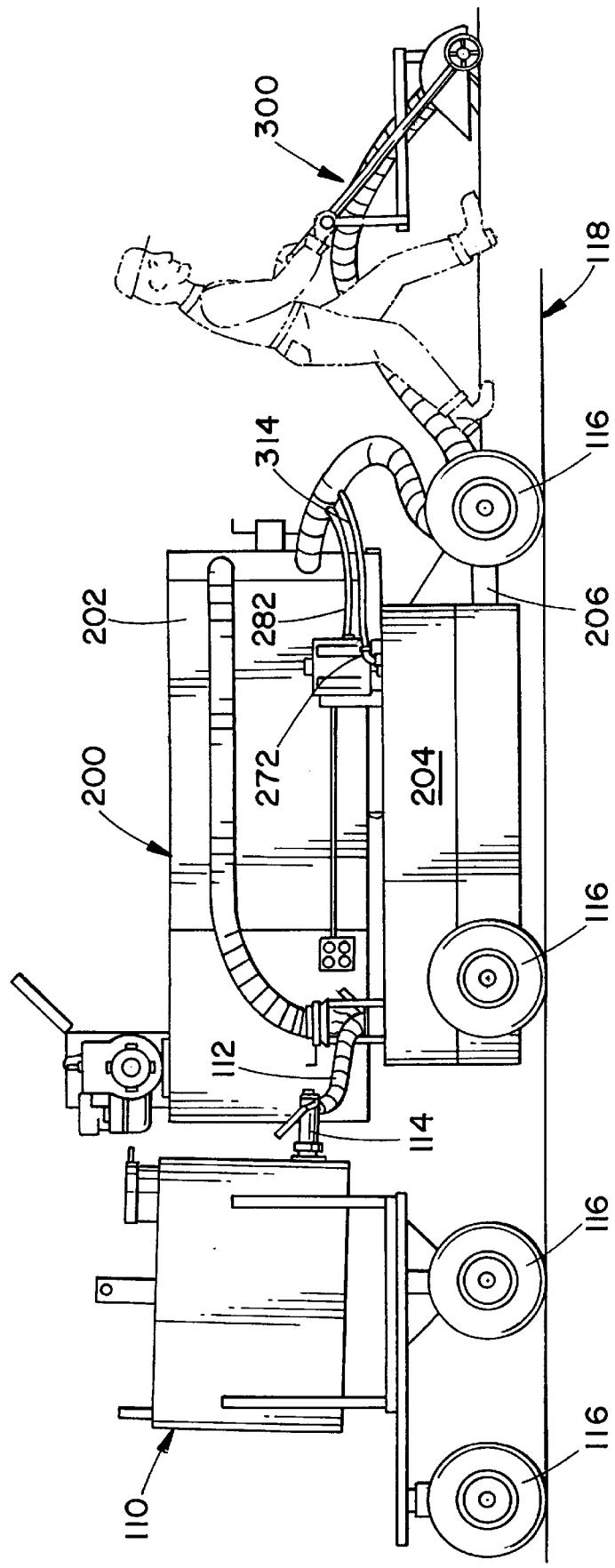
FIG. 7 is a side view of a compact mobile applicator system according to a preferred embodiment of the present invention.

Referring to FIG. 7, a compact, mobile self-contained application system according to a preferred embodiment of the present invention comprises three subassemblies: a fill lugger 110, a fume recovery system/bitumen reservoir assembly 200 and an applicator wand 300. Each of these will be described in detail below.

Fill lugger 110 may be coupled via fill conduit 112 to fume recovery system/reservoir assembly 200 such that fresh bitumen may be added to the reservoir while application of the bitumen is in progress. In this regard, fill lugger 110 may be used in the same manner as or in place of carrier 3, described above, in order to shuttle quantities of bitumen from a bulk supply tanker 1, situated on the ground. A valve 114 is provided to control gravity-fed egress of the bitumen from fill lugger 110. Large semi-pneumatic tires 116 are provided on fill lugger 110 to evenly distribute the load and reduce the force-per-unit area on roof surface 118.

Figure 8:
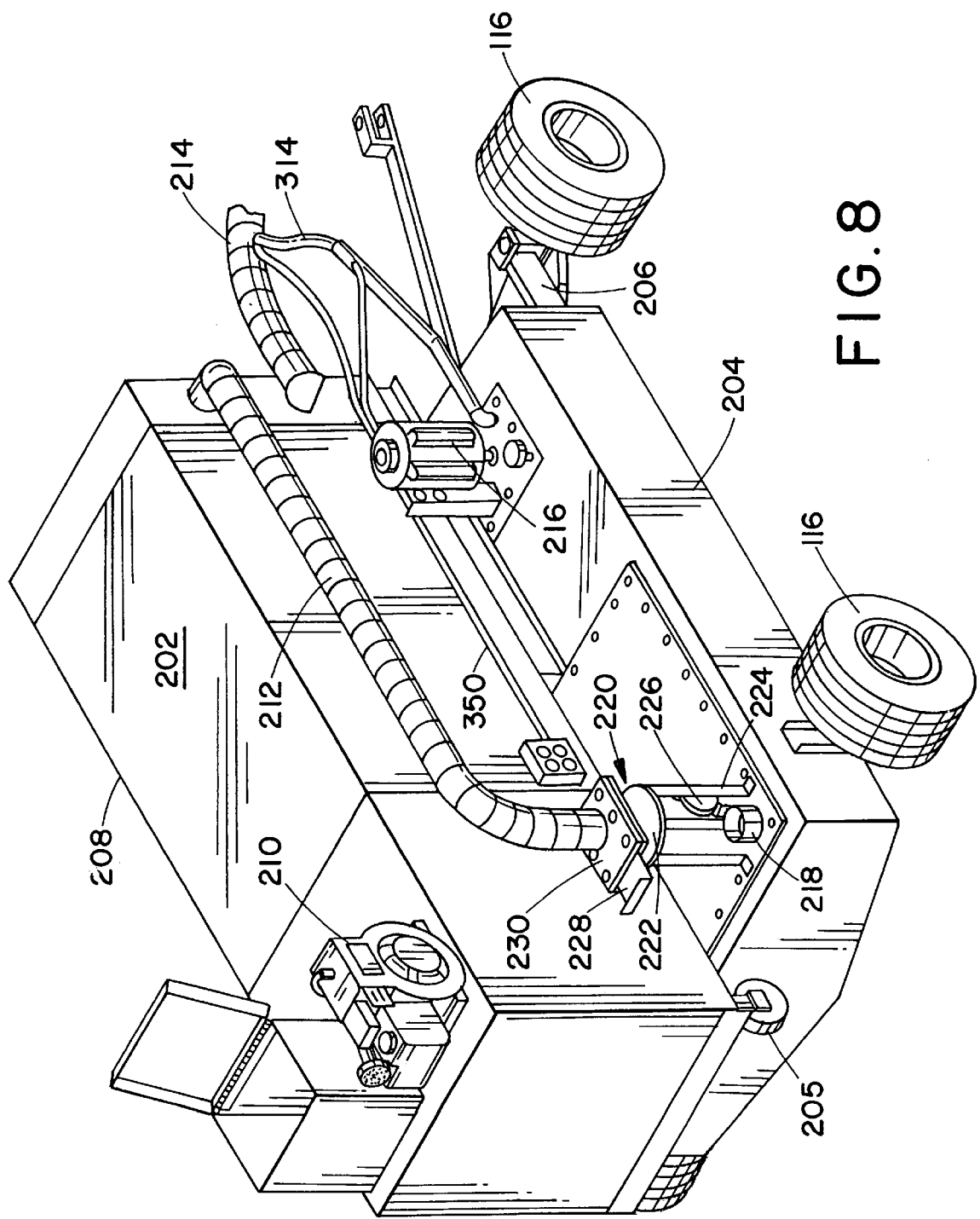
FIG. 8 is an isometric of a lugger/filter assembly according to the embodiment of FIG. 7.

Fume recovery system/reservoir assembly 200 comprises generally a filtration unit 202 and a bitumen reservoir 204 which is part of trailer frame 206, which is equipped with tires 116. Referring more particularly to FIG. 8, filtration unit 202 is situated on top of a bitumen reservoir 204 and includes a filter housing 208, engine 210, and inlet conduits 212 and 214. Bitumen reservoir 204 includes a pump motor 216, refill port 218, and refill fume recovery assembly 220.

Refill fume recovery assembly 220 includes a means for controlling emissions from the roofing product during refilling which comprises a fume recovery cone 222 which communicates with filter inlet conduit 212 and is mounted to reservoir 204 via supports 224 such that fume recovery cone 222 is disposed directly above refill port 218. A spring-loaded lid 226 having a resilient gasket thereon is provided to seal refill port 218 when not in use. A selectively movable dampening gate 228 is provided to control the suction from conduit 212 applied to fume recovery cone 222. Dampening gate 228 is sandwiched between two mounting plates 230 for sliding movement. Mounting plates 230 may be secured to fume recovery cone 222 or other structure to maintain a fixed relationship with respect to refill port 218. It will be recognized that a slot (not shown) is provided in fume recovery cone 222 or conduit 212 to accommodate dampening gate 228 when it is in a position to isolate fume recovery cone 222 from the vacuum provided in conduit 212. In this manner, dampening gate 228 may be moved (to the left in FIG. 8) such that the suction generated by filter unit 202 is applied to fume recovery cone 222 and fumes emitted during the filling of reservoir 204 with fresh bitumen are conveyed through filter unit 202.

Figure 9:
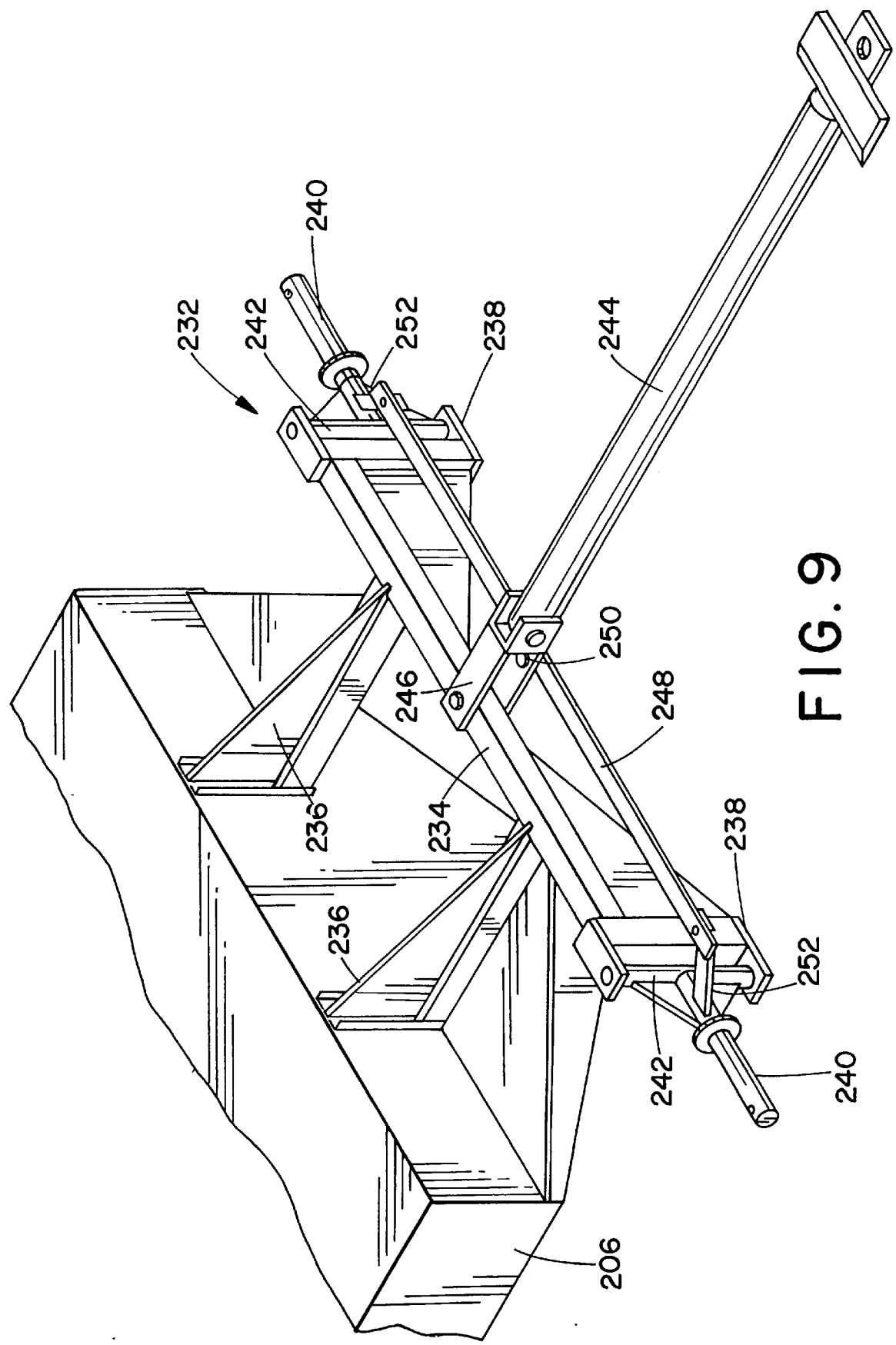
FIG. 9 is an isometric of a steering mechanism on the lugger/filter assembly of FIG. 8.

Referring particularly to FIG. 9, a steering mechanism 232 is provided on the front of trailer frame 206 to provide easy transport and control of fume recovery system/bitumen reservoir assembly 200. Steering mechanism 232 comprises a cross bar 234 secured to trailer frame 206 via flange members 236 and welds. Cross bar 234 is provided with a yoke 238 at opposite ends thereof. Within each yoke 238 is provided an axle 240 extending generally perpendicular to a pivot 242 which is rotatably mounted in yoke 238 in a known manner, i.e., using ball bearing elements (not shown). A towing bracket 246 is pivotally mounted control bar 244 for pivoting in a horizontal plane. A towing bar 244 is mounted to towing bracket 246 for movement in a generally vertical plane. A linkage bar 248 is fastened to towing bracket 246 by a pin 250 such that linkage bar 248 moves when towing bracket 246 pivots horizontally. Opposite ends of linkage bar 248 are pivotably fastened to pivots 242 via control bars 252 extending therefrom.

In operation, pivotal movement of towing bar 244 in a horizontal direction causes pivotal movement of pivots 242 and axles 240, thus steering the front wheels 116 (FIG. 7) of the fume recovery system/bitumen reservoir assembly 200. Steering mechanism 232 is capable of maintaining equal weight distribution on the front wheels 116 at all times, even during sharp turns. This structure is advantageous in preventing tipping of the fume recovery system/bitumen reservoir assembly 200 during transport and therefore provides enhanced safety.

Figure 10:
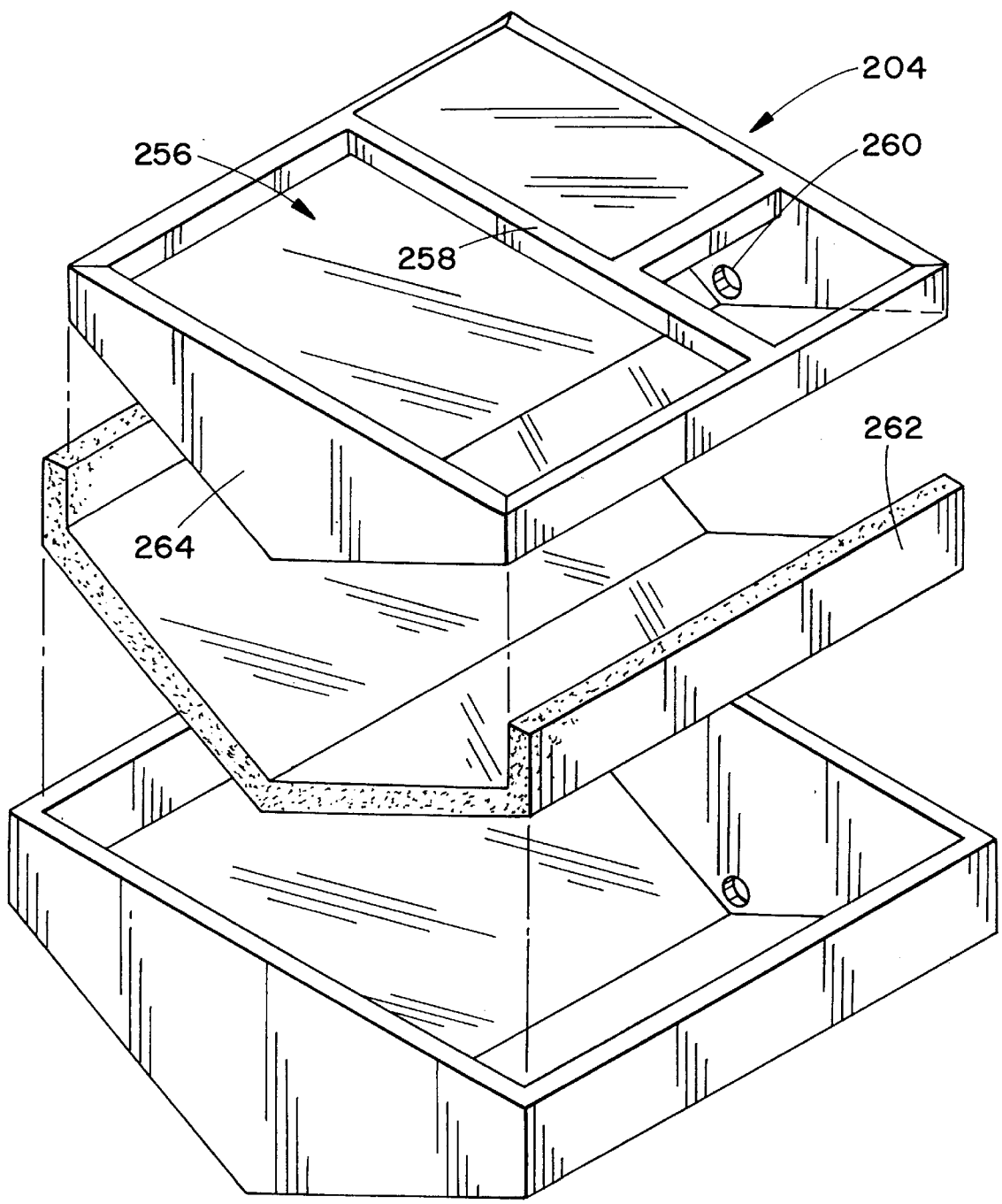
FIG. 10 is an exploded isometric of a bitumen-containing vessel of the lugger/filter assembly of FIG. 8.

Referring now to FIG. 10, bitumen reservoir 204 is of a generally inverted pyramidal shape and includes a superinsulated structure for containing bitumen and maintaining high temperature thereof Because of the superinsulated construction, in contrast to many prior art devices, bitumen reservoir 204 does not require a heating device therein for maintaining bitumen temperature. The inverted pyramidal shape of the reservoir provides for efficient removal of bitumen therefrom and a low center of gravity for stable transport and balance. Reservoir 204 comprises a vessel 256 which is constructed of a welded framework 258 of sheet metal that is capable of withstanding the temperatures (400–500 degrees Fahrenheit) of the hot bitumen. In FIG. 10, the top panel of the vessel 256 is omitted to reveal the framework 258. A drain port 260 is provided to permit removal of bitumen.

An insulating shell 262 is provided around vessel 256. Insulating shell 262 may be formed of ceramic fiber or other known superinsulative material. It is shaped in complementary fashion to accommodate and entirely surround vessel 256, although FIG. 10 omits the top and side portions for clarity. Between insulating shell 262 and vessel 256, there may be provided a refractory coating 264 which may be troweled onto the outer surface of vessel 256 to form a thick layer thereon. It will be recognized that the superinsulative structure of the bitumen reservoir 204 eliminates the need for a secondary heat source within the container, thereby adding to the simplicity and safety of the system.

Figure 11:
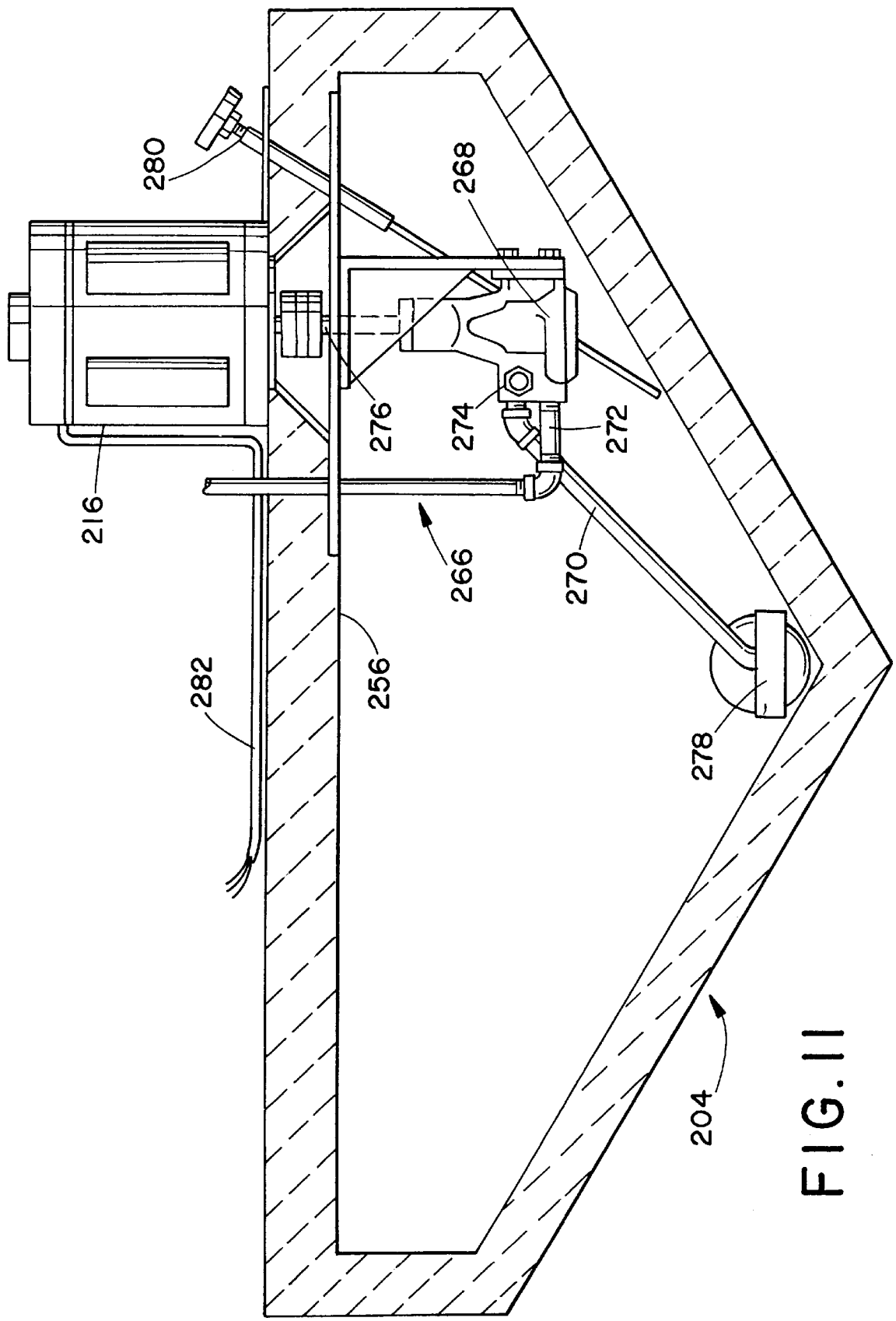
FIG. 11 is a section of a bitumen-containing vessel and pump assembly of the lugger/filter assembly of FIG. 8.

Referring further to FIG. 11, a sectional view of the bitumen reservoir 204 showing the details of bi-directional pump assembly 266. In accordance with the present invention, pump 268 is provided on the interior of reservoir 204 and includes an inlet 270, an outlet 272, a relief valve 274 and a drive shaft 276. Drive shaft 276 is coupled to motor 216 and sealed for rotatable movement with respect to vessel 256 in a known manner. Pump inlet communicates with a filter 278 disposed in the lower extremity of the bitumen reservoir 204. A temperature gauge 280 is provided to indicate the bitumen temperature to an operator. Pump motor 216 is control via control wires 282 in a manner that will be further described below. Pump 268 is provided as a bi-directional pump in order that, as will be further explained below, flow of bitumen to the applicator 300 may be reversed for cleaning purposes.

Figure 12:
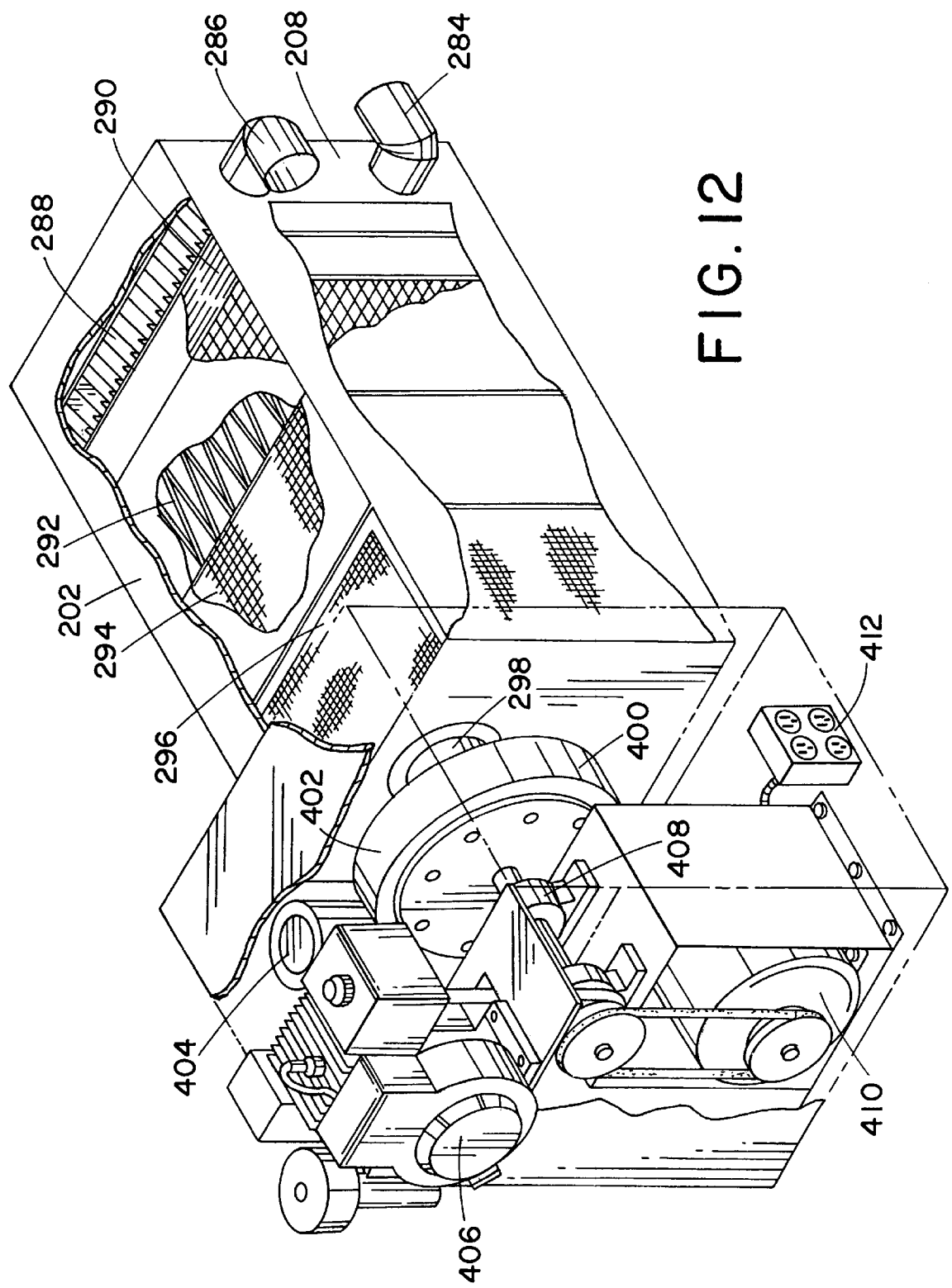
FIG. 12 is an isometric cutaway of a filter and blower assembly of the lugger/filter assembly of FIG. 8.

FIG. 12 is a cutaway that illustrates the details of a filter unit 202 of the fume recovery system according to the present invention. It will be recognized that filter unit 202 will be constructed in a manner similar to the construction of filtration unit 10, described above with reference to FIG. 2, and will have similar functional attributes. Housing 208 is constructed of sheet metal which is lightweight yet strong enough to provide support and prevent damage to the internal components. A pair of inlets 284 and 286 are provided in communication with the interior of filter housing 208 to present two vacuum sources, one of which is used in conjunction with the aforementioned fume recovery cone 222 and the other of which is used to provide fume removal at applicator 300 as will be described below.

The internal components of filter unit 202 include a set of impingers 288, a pleated filter stage 290, a Vee-box 292, a high-efficiency particulate air (HEPA) filter 294, and a carbon filter 296. A filter outlet 298 is provided at an end of filter unit 202 opposite inlets 284 and 286 and communicates with a blower 402 including a blower housing 400 which houses an impeller (not shown) to create a vacuum therewithin. An outlet port 404 is provided on blower housing 400 for egress of filtered air.

A blower engine 406 is provided to drive blower 402 through a suitable power train 408. In accordance with the present invention, blower engine 406 is also coupled to a belt-driven power generator 410 to provide electric power on the fume recovery system/bitumen reservoir assembly. This electric power may be used to drive the aforementioned pump motor 216 as well as various electrical implements that may be used on the roofing site. To that end, a power receptacle 412 is connected to the output of power generator 410.

In accordance with another aspect of the invention, filter unit 202 may be provided in modular form as a module that is removably attached, i.e., using known releasable couplings, to bitumen reservoir 204 and easily detached therefrom. This aspect provides for quick assembly and disassembly of the fume recovery system/reservoir assembly 200 and for easy transport of the separable filter unit module. As a further aspect of the invention, filter unit 202 may be provided with wheels 205 (one shown in FIG. 8) on its underside to permit rolling transport of filter unit 202 as a separate unit.

Referring to FIG. 14 and to FIG. 7, the present invention provides an applicator wand 300 which is highly maneuverable and capable of applying bitumen in an efficient manner and controlling emissions thereof. Applicator wand 300 is in communication with pump outlet 272 via bitumen dispensing tube 314. Applicator wand 300 comprises generally an applicator frame 316 which includes a push handle 318 extending therefrom and an orifice pipe 320, in fluid communication with bitumen dispensing tube 314 and including a plurality of orifices for dispensing hot bitumen in streams 322 to the roof surface. Applicator wheels 324 are rotatably mounted with respect to orifice pipe 320 and are constructed of heat and fire resistant material such as high-temperature phenolic resin.

In accordance with the present invention, a means for controlling emissions from the roofing product is provided in the form of a fume hood 326 (shown in dotted lines in FIG. 14) and vacuum conduit 214. Fume hood 326 and vacuum conduit 214 are provided to control the emissions from the bitumen emanating from orifice pipe 320 and impinging on the roof surface. Fume hood 326 is mounted on applicator frame 316 and is provided with a port in communication with vacuum conduit 214 which provides suction thereto and conveys bitumen emissions to filter unit 202. A sight guide 328 is provided to indicate to the operator where the bitumen is being applied under the fume hood 326. A special stainless steel ball and chain bead 330 is attached to the applicator frame 316 such that it drags behind orifice pipe 320.

Applicator wand 300 is provided with controls for the operation of pump 216 and for the flow of bitumen from the orifice pipe 320. A twist control 322 is rotatably mounted to applicator frame 316 to actuate a bitumen flow control linkage 334, which may be a simple crank mechanism. Surrounding orifice pipe 320, is a flow control shell 336 which is flush mounted to the outer surface of orifice pipe 320 and movable with respect thereto via control switches 338. Flow control surface is provided with a number of passages therein which, in the open position of control surface, align with the orifices in orifice pipe 320 to permit bitumen to flow therefrom. In the closed position of control shell 336, orifices in orifice pipe are blocked and no bitumen flow occurs.

According to a preferred embodiment of the invention, pump control switches 338 are provided on handle 318 and electrically connected to control wires 282 such that an operator can control the flow of bitumen to applicator 300 and orifice pipe 320. A reverse flow switch is provided such that bitumen may be caused to flow back into reservoir 256 from applicator 300 for cleaning purposes, or to prevent clogging in the orifice pipe.

In accordance with the present invention, the pump control wires 282 and the bitumen dispensing tube 314 are disposed on the interior of vacuum conduit 214. This has be advantage of improving operator safety by isolating personnel from the electrical currents in wires 282 and from the high temperature of bitumen dispensing tube 314. As can be seen in FIG. 14, bitumen dispensing tube 314 exits vacuum conduit 214 through the end communicating with fume hood 320.

According to another aspect of the invention, the bitumen dispensing tube 314 is provided with a heating element therein as partially shown in FIG. 8. Heating element 350 is electrically connected to power generator 410 (FIG. 12) through a thermostatic control element (not shown in FIG. 8). Heating element 350 extends to vacuum conduit 214 and into the interior of bitumen dispensing tube 314 through a suitable seal. This construction offers the advantage of providing a means for maintaining the temperature of the bitumen as it flows through the dispensing tube 314. In some roofing applications, a dispensing tube length of 100 feet may be required. In cold weather, for example, the bitumen will experience significant reduction in temperature and, therefore, viscosity as it travels through longer lengths of the dispensing tube. The use of the heating element 350 thus provides a means to ensure that the temperature and viscosity of the bitumen remains adequate.

Figure 13A:
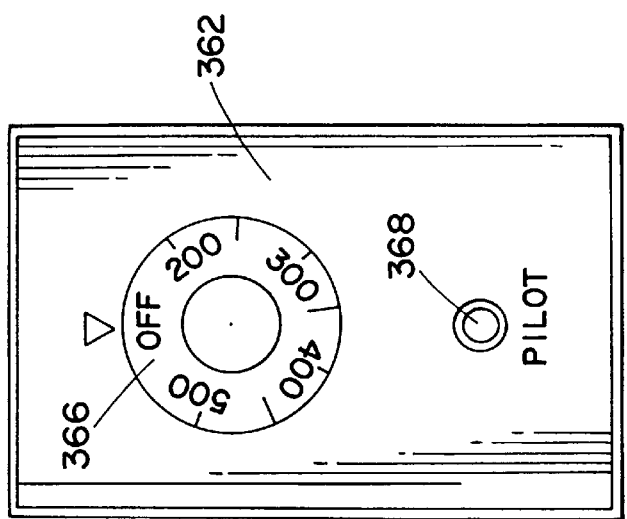
FIG. 13A is a side view of a heating element applicable to the compact mobile applicator system of FIG. 7.

The details of heating element 350 will now be explained with particular reference to FIGS. 13A–13C. FIG. 13A is a side cutaway view and FIG. 13B is a cross-sectional view of a bitumen dispensing tube 314 having a heating element 350 therein according to a preferred embodiment of the present invention. Bitumen dispensing tube 314 is constructed of a flexible inner TEFLON tube 315 wrapped on its exterior by a stainless steel shielding layer 317. This construction supports sufficient operating pressures without presenting a danger to operators. Heating element 350 is illustrated in FIG. 13B as being centrally located within bitumen dispensing tube 314. Heating element 350 comprises two A.G. bus resistance wires 352 which are provided with controlled current to generate heat. Surrounding bus wires 352 is a jacket of extruded TEFLON insulation 354 and wrapped nickel-chromium resistance wire 356. Disposed there around is a layer of KAPTON film 358 which is surrounded by another layer of TEFLON insulation 360. These outer layers act to shield the internal heat source comprised of wires 352 and to provide evenly distributed transfer of heat to the bitumen.

Figure 13C:
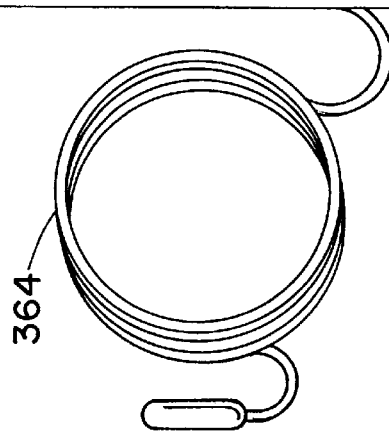
FIG. 13C is a schematic diagram of a thermostatic control device for use in conjunction with the heating element of FIGS. 13A and 13B.
Figure 13B:
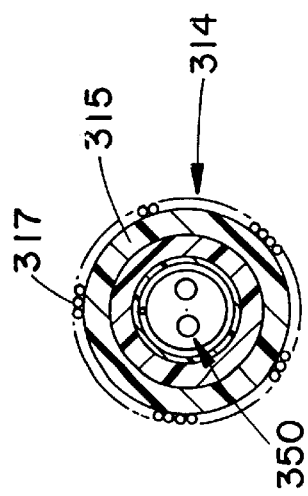
FIG. 13B is a section of the heating element of FIG. 13A.

A thermostatic control element 362, such as that illustrated in FIG. 13C may be used to control the temperature of heating element 350. Thermostatic control 362 includes a capillary sensing tube 364 which would be disposed within the interior of bitumen dispensing tube 314 in contact with the bitumen therein. Heating element 350 is electrically connected to thermostatic control element 362 and controlled in closed-loop fashion via temperature selector 366 with feedback from capillary sensing tube 364 in a known manner. Pilot light 368 may be provided to indicate when power is being applied to heating element 350.

It will be recognized from the foregoing description that the compact mobile application system of the present invention, as reflected in the above described embodiment, provides a novel and useful device for applying roofing products and controlling emissions therefrom. The applicator wand is highly maneuverable and, in conjunction with the trailer-based compact fume recovery system/bitumen reservoir, may be used to efficiently and safely treat a widespread roof area with ease.

Accordingly, the various filtration units and system described above are used for industrial, commercial and residential applications, such as for reducing the emission of bituminous fumes and odors into the surrounding atmosphere by capturing the fumes at their source at the ground and roof levels and then filtering them to remove most of the contamination prior to their release back into the atmosphere. This system significantly reduces the transmission of these fumes to both personnel and the environment. The system preferably is utilized during the installation of bituminous roofing products to reduce the transmission of fumes and odors inherent in these processes to both personnel and environment. However, the system and filtration units can be used for filtering other fumes, both initially heated or unheated, occurring from sources other than bituminous roofing products without affecting the concept of the invention. Likewise, burner unit 77 may be incorporated into the filtration unit to assist in removing certain gases, oils and vapors contained in a particular incoming fume stream to increase the efficiency of the filtration unit. Likewise, the introduction of outside ambient air to cool the heated fumes, whether heated at the material source or in combination with the burner units, further increases the efficiency of the filtration unit.

It has been found that the incineration provided by burning unit 77 will reduce a series of heavy oils and vapors into lighter, dryer and more readily removed particulates. Likewise, the plenum may be used as a settling area for larger ash particulates resulting from the combustion products within burner chambers 78. This incineration process is then facilitated by the introduction of cooling air into the plenum and the sudden slowing of fume velocity when entering the larger volume of the plenum chamber.

In the foregoing description, certain terms have been used for brevity, clearness and understanding; but no unnecessary limitations are to be implied therefrom beyond the requirement of the prior art, because such terms are used for descriptive purposes and are intended to be broadly construed. Moreover, the description and illustration of the invention is by way of example, and the scope of the invention is not limited to the exact details shown or described.

Accordingly, the system of the present invention for removal of noxious fumes is simplified, provides an effective, safe, inexpensive, and efficient system which achieves all the enumerated objectives, provides for eliminating difficulties encountered with prior systems, and solves problems and obtains new results in the art.

Having now described the features, discoveries and principles of the invention, the manner in which the improved system is constructed and used, the characteristics of the construction, and the advantageous, new and useful results obtained; the new and useful structures, devices, elements, arrangements, parts and combinations, are set forth in the appended claims.

What is being claimed is:

1. A system for applying roofing product to a surface comprising:
   a) a reservoir for containing a supply of the roofing product;
   b) a dispensing conduit having first and second ends, the first end being connected to the reservoir for conveying the roofing product from the reservoir; and
   c) an applicator maneuverable relative to the reservoir, the applicator being connected to the second end of the conduit, for applying the roofing product to the surface, the applicator including fume collecting means for controlling emissions from the roofing product at the point of application of the roofing product.

2. The system according to claim 1, wherein the means for controlling emissions comprises a fume hood.

3. The system according to claim 2, wherein the system further comprises a vacuum source and wherein the means for controlling emissions further comprises a vacuum conduit in communication with the fume hood and the vacuum source.

4. The system according to claim 3, wherein the vacuum source comprises a filter unit for processing emissions from the roofing product.

5. The system according to claim 1, further comprising a fume recovery system having a filter for processing emissions from the roofing product.

6. The system according to claim 5, wherein the fume recovery system is removably mounted on the reservoir.

7. The system according to claim 6, wherein the reservoir is mounted on a mobile trailer.

8. The system according to claim 1, wherein the applicator comprises:
   an elongate orifice pipe communicating with the dispensing conduit for dispensing the roofing product onto the surface;
   at least one wheel for supporting the orifice pipe for rolling movement on the surface;
   a handle extending upwardly from the orifice pipe to permit a user to manipulate the orifice pipe.

9. The system according to claim 8, wherein the applicator further comprises a flow control surface disposed on the orifice pipe to permit the user to control the flow of roofing product onto the surface.

10. The system according to claim 9, wherein the flow control surface is actuated by a twist grip on the applicator.

11. The system according to claim 1, wherein the dispensing conduit is provided with a heating element for heating the roofing product therein.

12. The system according to claim 1, wherein the means for controlling emissions comprises a fume hood and a vacuum conduit communicating therewith and wherein the dispensing conduit extends within the vacuum conduit.

13. An apparatus for storing roofing product and recovering fumes emitted therefrom comprising:
   a reservoir for containing a supply of roofing product;
   a refill port disposed within the reservoir for permitting ingress of a refill supply of roofing product into the reservoir;
   means for controlling emissions from the roofing product during refilling of the reservoir through the refill port, the means for controlling emissions comprising a fume recovery cone disposed directly above the refill port; and
   a filtration unit situated above the reservoir, the filtration unit comprising a vacuum conduit communicating with the fume recovery cone.

14. The apparatus according to claim 13, wherein the fume recovery cone is mounted on the reservoir.

15. The apparatus according to claim 13, wherein the filtration unit is removably mounted on the reservoir.

16. The system according to claim 13, wherein the reservoir is provided with insulation to reduce the transfer of heat from the roofing product contained therein.

* * * * *